Jan. 3, 1933.  J. ANINGA  1,892,744
DEVICE FOR STRINGING GLASS BODIES ON A MANDREL
Filed June 15, 1931  2 Sheets-Sheet 2
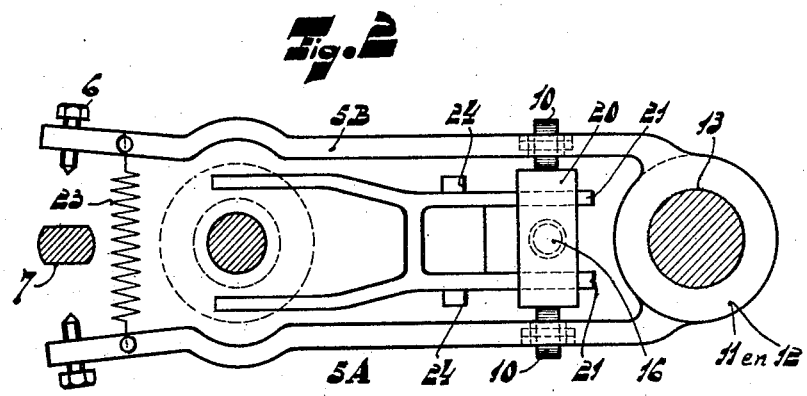
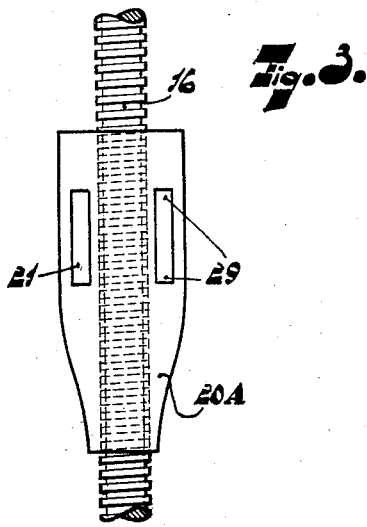
Inventor:
J. Aninga Patented Jan. 3, 1933

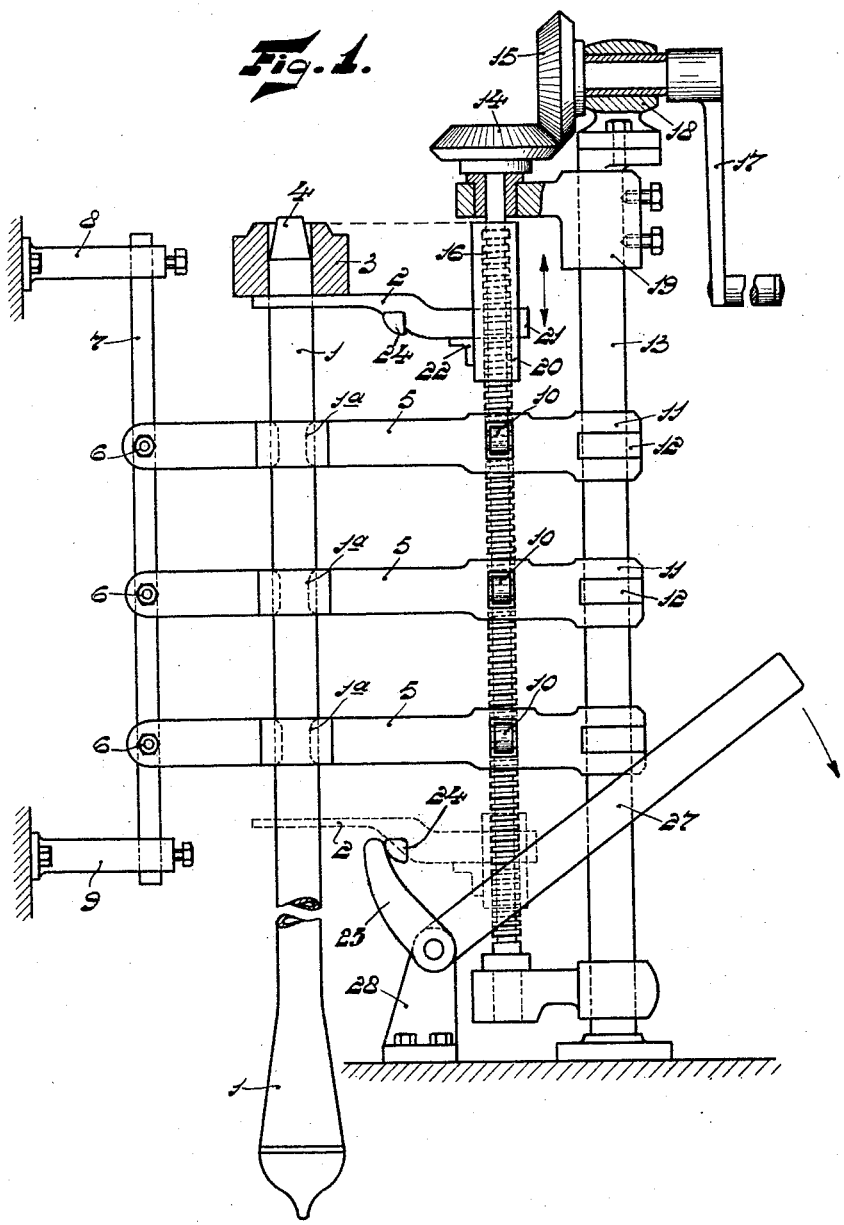

1,892,744

UNITED STATES PATENT OFFICE

JOHANNES ANINGA, OF EINDHOVEN, NETHERLANDS, ASSIGNOR TO N. V. MAATSCHAPPIJ TOT EXPLOITATIE VAN UITVINDINGEN, OF ROTTERDAM, NETHERLANDS

DEVICE FOR STRINGING GLASS BODIES ON A MANDREL

Application filed June 15, 1931, Serial No. 544,631, and in the Netherlands June 27, 1930.

This invention relates to a device for the piling up of glass objects on a stationary or rotary mandrel, which mandrel is given a vertical or inclined position and which is supported by suitable supporting devices, the operation of which corresponds to that of a sluice system.

On this mandrel a plurality of ring-like glass objects may be piled one upon the other, the glass objects, which preferably have been preheated, descending along the mandrel to the bottom thereof. They are then heated again at the lower side of the mandrel or in the vicinity thereof in such manner that such glass objects fuse together. After such heating the plastic mass may be drawn from the lower end of the mandrel in the form of glass tubes or rods. As indicated above, the mandrel is supported by a series of vertically aligned supports, which successively move away from the mandrel to permit movement of the glass objects therealong without destroying the supporting effect imparted to the mandrel.

According to my invention such device comprises a carrier for the glass object, which is arranged for movement in the longitudinal direction of the mandrel and which at the same time may be coupled to the motivating mechanism for the supporting devices.

In a preferred form of construction of my invention the carrier has substantially the shape of a fork.

The opening and closing of the supporting devices for the mandrel, which may be constituted for example, of jaws engaging the mandrel, is effected by a cam, to which the carrier may be fixed. This attachment may be movable, for instance, in such manner that the carrier is also movable in a direction perpendicular to the mandrel. Such perpendicular movement is provided for withdrawing the carrier from under the glass object, so that it no longer supports the latter. The further advantages of a device according to the invention will be more clearly understood by reference to the accompanying drawings, wherein Fig. 1 is a side elevation, partly in section, showing the mandrel together with the supporting devices, which are constituted, for example, by tongs.

Fig. 2 is a plan view, showing the supporting tongs, as well as the cam 20 by which the said tongs are opened. The tongs are shown in opened position, through which opening the fork-shaped carrier 2 may pass when moving along the mandrel.

Fig. 3 is a side view of the cam which causes the tongs to move away from each other against the action of a spring.

Fig. 1 shows a mandrel 1 supported by tong-shaped supporting devices 5 which surround the mandrel and are arranged in the recessed portions 1a of the mandrel. A carrier for the glass objects is shown at 2. As an example a glass body 3 is shown, which body is slipped on the mandrel at 4. The carrier 2 is movable in a direction perpendicular to the axis of the mandrel, and for this purpose is slidably mounted in the cam 20, which latter is shaped as a wedge and is movable along the screw spindle 16. As shown on the drawing the carrier is additionally supported by an angle piece 22 fixed to the cam. Two cams 24 are shown as being secured directly to opposite sides of the carrier. If the carrier occupies the lowermost position as shown in dotted lines in Fig. 1, the cam 24 may be moved away from the mandrel by a cam 25, which in turn is operated by a handle 27. Due to this movement of the carrier it no longer supports the glass block. The cam 25 with its handle 27 is pivotally supported at 28. It is represented only schematically and may be constructed for automatic operation.

For clearness sake the process carried out by means of this device is briefly set out hereinafter and at the same time the advantage of the carrier will be better understood.

Fig. 1 shows the device in the position in which the process begins. In the position of the carrier indicated in dotted lines the transport of the glass body, so far as it is effected by the device, stops. The screw spindle 16 is turned by the handle 17 through the intermediary of the toothed wheels 14 and 15 which are supported in the blocks 18 and 19 fixed to the column 13. Due to this construction the wedge-shaped cam 20 is moved downwardly, together with the carrier 2 and the glass body. The cam 20 moves the rolls 10 away from each other, owing to which the jaws or tongs 5A and 5B are opened so that the mandrel is released (see Fig. 2). At the same time the cam together with the carrier and the body are allowed to pass between the jaws. After the cam and the carrier have passed, the tongs 5A and 5B are closed by the action of a spring 23. The alternative opening and closing of the successive supporting devices consequently resembles the movement of a row of sluices. Hence my reference to a sluice-system. The cam 20 keeps on descending, and the opening and closing is repeated at each of the following tong supports. If thereupon the carrier 2 in the position shown in Fig. 1 in dotted lines is withdrawn, the glass body is supported by the bodies previously piled up.

If the carriers were not provided as a support for the body, the glass body at the vertical position of the mandrel would fall freely on its way between two tongs and on the way along the mandrel preceding the first tong, and would consequently run the risk of breaking, bursting, or cracking when contacting the tongs 5. However, the fork-shaped carrier effectively prevents this.

Fig. 3 shows more clearly the contour 20A of the cam 20, and in addition it shows that the forks of the carrier 2 slide in the slots 29 of the cam 20. It is observed that all of the tongs and the further mechanisms are ultimately supported by the column 13. Thus it is possible to swing the tongs away together with the mandrel, it being necessary to produce this effect only to remove the rod 7 shown in Fig. 1. This rod, which is also shown in Fig. 2, serves as a stop for the set bolts 6 provided in the jaws 5A and 5B. Due to this it is possible to adjust the position of the jaws with respect to the mandrel.

After the glass bodies have passed all of the tongs 5, the row of bodies moves further downward along the mandrel, and is locally very evenly heated and then drawn from the enlarged end of the mandrel, whereby glass tubes or rods are obtained.

What I claim is:

1. A device for piling up glass objects on a mandrel, comprising a plurality of devices for the support of the mandrel and being successively removable from the mandrel, whereby the next successive support serves as the support for said mandrel, and a carrier for the glass objects adapted to move longitudinally along the mandrel.

2. A device for piling up glass objects on a mandrel, comprising a plurality of devices for the support of the mandrel and being successively removable from the mandrel, whereby the next successive support serves as the support for said mandrel, a carrier for the glass objects adapted to move longitudinally along the mandrel, and actuating mechanism for the said carrier and to which the said carrier is coupled.

3. A device for piling up glass objects on a mandrel, comprising a plurality of devices for the support of the mandrel and being successively removable from the mandrel, whereby the next successive support serves as the support for said mandrel, and a fork-shaped carrier for the glass objects adapted to move longitudinally along the mandrel.

4. A device for piling up glass objects on a mandrel, comprising a plurality of devices for the support of the mandrel and being successively removable from the mandrel, whereby the next successive support serves as the support for said mandrel, a movable cam, for effecting the opening and closing of the supporting devices, and a carrier for the objects to be piled on the mandrel, said carrier being movably secured to said cam.

5. A device for piling up glass objects on a mandrel, comprising a plurality of devices for the support of the mandrel and being successively removable from the mandrel, whereby the next successive support serves as the support for said mandrel, a movable cam, for effecting the opening and closing of the supporting devices, and a carrier for the objects to be piled on the mandrel, said carrier being movably secured to said cam, and being adapted for movement perpendicularly to the mandrel.

In testimony whereof I have signed my name to this specification.

JOHANNES ANINGA.